United States Patent [19]

Golembeski

[11] 3,713,050

[45] Jan. 23, 1973

[54] INTEGRATED CIRCUIT TRANSFORMERS EMPLOYING GYRATORS

[75] Inventor: John Joseph Golembeski, New Providence, N.J.

[73] Assignee: Bell Telephone Laboratories Incorporated, Murray Hill, N.J.

[22] Filed: May 11, 1971

[21] Appl. No.: 142,181

[52] U.S. Cl. ..............................333/24 R, 333/80 R

[51] Int. Cl. ..............................................H03h 7/44

[58] Field of Search.........333/24 R, 80 R, 80 T, 24.1

[56] References Cited

UNITED STATES PATENTS 2,775,658 12/1956 Mason et al....................333/80 R X 3,517,342 6/1970 Orchard et al.....................333/24 R

OTHER PUBLICATIONS

Sheahan, D. F., Gyrator-Flotation Circuit, Electronics Letters, Jan. 1967, pp. 39, 40.

*Primary Examiner*—Paul L. Gensler

*Attorney*—R. J. Guenther and Edwin B. Cave

[57] ABSTRACT

In an integrable circuit transformer employing cascade-connected gyrators, frequency response characteristics and the effective turns ratio are tailored and controlled by one or more two-port coupling networks that may be connected between the circuit input and the primary gyrator, between the two gyrators or between the secondary gyrator and the circuit output.

2 Claims, 15 Drawing Figures

INVENTOR
J. J. GOLEMBESKI
BY
ATTORNEY

INTEGRATED CIRCUIT TRANSFORMERS EMPLOYING GYRATORS

BACKGROUND OF THE INVENTION

1. Field of the Invention

This invention relates to transformers and more particularly to transformers without coils which are suitable for fabrication by integrated circuit techniques.

2. Description of the Prior Art

Repeated advances in the state of the art of integrated circuits have made this circuit form an increasingly common choice over discrete component forms. Nevertheless, there are still restrictions on the kinds of circuits that may be fully integrated — circuits employing inductors being the most significant example. In those instances where only very low inductance values are required, integration may be effected by fabricating thin film coils in the form of flat spirals. Where more appreciable inductance is need, however, conventional practice still calls for the use of discrete inductive elements.

A partial solution to the problem indicated lies in the use of special integrable networks having inductive characteristics rather than in attempts to integrate inductive devices directly. Such networks, known as gyrators, are generally described as antireciprocal, two-port networks and are formed from a combination of integrable active and passive circuit elements which may include, for example, transistors, capacitors and resistors. The combination, in effect, provides inductance although no coils or inductors in the conventional sense are employed. Illustrative gyrators are shown in U.S. Pat. No. 3,001,157, issued Sept. 19, 1961 to J. M. Sipress and F. J. Witt.

Although gyrators have been employed successfully in lieu of inductors in practical circuits such as filters, as described for example by Sipress and Witt, in other areas their application has been limited to theoretical proposals. One such area is that of transformers. The basic theory of gyrator utilization to form a transformer has been described in work disclosed by B. D. H. Tellegen in an article, "The gyrator, A New Electric Network Element", *Phillips Research Reports*, Vol. 3, No. 2, pages 81–101, April 1948.

Despite the seemingly very attractive advantages promised by the potential availability of transformers in integrated circuit form, no practical circuits of this type have heretofore been realized. This absence of effective implementation following the theoretical work of Tellegen appears to be due at least in part to the lack, heretofore, of a capability for controlling and tailoring the transformer characteristics in terms of both frequency response and effective turns ratio.

Accordingly, a broad object of the invention is to shape the characteristics of a gyrator-based transformer without, however, resort to nonintegrable elements.

SUMMARY OF THE INVENTION

The stated object and additional objects are achieved in accordance with the principles of the invention by the combination of a pair of integrable gyrators connected in cascade together with one or more two-port coupling networks, each of which also includes only integral circuit elements. In one embodiment of the invention, a primary coupling network is connected between the transformer input terminals and the gyrator primary circuit, a secondary coupling network is connected between the gyrator secondary circuit and the transformer output terminals and an intermediate coupling network is connected between the primary and secondary gyrators.

In accordance with one feature of the invention the equivalent of a transformer in combination with a series connected floating inductor is realized by employing a single intermediate coupling network comprising only a single integrable circuit element in combination with the basic cascaded gyrator pair described above.

Another aspect of the invention involves the selection and interconnection of coupling networks with a cascaded gyrator pair to achieve an efficient wideband transformer design.

DETAILED DESCRIPTION

Figure 1:
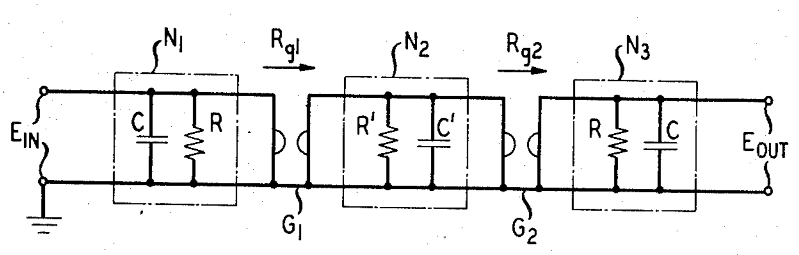
FIG. 1 is a schematic circuit diagram of an integrable transformer circuit in accordance with the invention.

As shown in FIG. 1, a transformer in accordance with the invention employs a first or primary gyrator $G_1$ connected in cascade or tandem relation with a second or secondary gyrator $G_2$. These gyrators may take any one of a number of gyrator forms including, for example, the gyrator disclosed by Sipress and Witt in the patent cited above. In accordance with the invention, both the turns ratio and the frequency response of the circuit of FIG. 1 are controlled by the use of one or more of the coupling networks $N_1$, $N_2$ or $N_3$. As used herein, the term "coupling network" is meant to define a network combined with a pair of cascade-connected gyrators in the manner illustrated by FIG. 1.

In accordance with the form of the invention illustrated by the circuit of FIG. 1, each of the networks $N_1$ and $N_3$ includes a shunt capacitor C (C' in the intermediate network $N_2$) and a shunt resistor R (R' in the intermediate network $N_2$), although it is to be understood that the principles of the invention are not restricted to this particular combination of circuit elements in the coupling networks. The analysis which follows shows that with the proper proportioning of the coupling networks, in accordance with the features of the invention, desired transformer characteristics in terms of both frequency response and turns ratio may readily be achieved. In order to simplify and clarify the mathematical aspects of the analysis, it is assumed that the magnitudes of the resistors R and of the capacitors C of the networks $N_1$ and $N_3$ are identical. It is further assumed that the magnitude of the resistor R' and of the capacitor C' is equal to one-half the magnitude of the resistors R and of the capacitors C, respectively. The transmission matrix for the circuit of FIG. 1 is given by:

$$\begin{bmatrix} E_{IN} \\ I_{IN} \end{bmatrix} = \begin{bmatrix} A_t B_t \\ C_t D_t \end{bmatrix} \begin{bmatrix} E_{OUT} \\ -I_{OUT} \end{bmatrix} \quad (1)$$

where it may be shown that:

$$A_t = (2R_{g1}R_{g2}C^2)s^2 + \left(\frac{4R_{g1}R_{g2}}{R}C\right)s + \left(\frac{2R_{g1}R_{g2}}{R_2} + \frac{R_{g1}}{R_{g2}}\right) \quad (2)$$

$$B_t = \left(\frac{R_{g1}R_{g2}}{R}\right)(sRC+1) \quad (3)$$

$$C_t = \frac{R_{g1}+R_{g2}}{R}(sRC+1) \times \left[\frac{R_{g1}R_{g2}}{R_2}(R^2C^2s^2+2RCs+1)+1\right] \quad (4)$$

and $$D_t = \frac{R_{g1}R_{g2}}{R}\left[2(sRC+1)^2 + \left(\frac{R}{R_{g1}}\right)^2\right] \quad (5)$$

In equations (2), (3), (4) and (5) the gyration resistance of the primary gyrator $G_1$ is designated by $R_{g1}$ and the gyration resistance of the secondary gyrator $G_2$ is indicated by $R_{g2}$. The open circuit voltage transfer ratio $E_{OUT}/E_{IN}$ for the circuit is the turns ratio $n$ of the simulated transformer and is given by:

$$n = \frac{E_{OUT}}{E_{IN}} = \frac{1}{A_t} = \frac{(2R_{g1}R_{g2}C^2)^{-1}}{s^2 + \frac{2}{RC}s + \left(\frac{2R_{g2}^2+R^2}{2R_{g2}^2R^2C^2}\right)} \quad (6)$$

Of particular significance is the quadratic response characteristic evident from equation (6). Additionally, it should be noted that the pole locations are a function of the elements R and C.

A cascade connection of ideal gyrators corresponding to R=α and C=0 simulates a transformer with turns ratio given by:

$$n = Rg_2 1 Bg_1 \quad (7)$$

The nonideal transformer, however, results from including shunt R and C in the circuit and the low frequency turns ratio $n(O)$ is given by equation (6) with $C=O$, i.e., $$n(O) = \frac{Rg_2}{Rg_1}\left(\frac{1}{2\left(\frac{Rg_2}{R}\right)^2+1}\right) \quad (8)$$

which reduces to equation (7) when R becomes infinite.

The two-pole response characteristic given in equation (6) implies that the high frequency performance of the transformer can be tailored to meet a selected response shape. This implication, upon which the principles of the invention rest in part, has been substantiated and verified by testing a transformer in accordance with the invention which was designed to conform to a particular response shape, namely the well-known ½ dB Chebyshev response. This design was effected by conventional polynominal coefficient matching and frequency scaling. The actual circuit topology conforms to the circuit shown in FIG. 1 and was found to form the basis for an efficient wideband design.

The circuit design indicated was carried out with reference to the conventional normalized second degree ½ dB Chebyshev polynominal.

$$P_2(s) = s^2 + 1.4256s + 1.5162, \quad (9)$$

for which the ½ dB bandwidth is 1 rad/sec. The denominators of equations (6) and (10) are equated to obtain the ½ dB Chebyshev response shape which results in the determination of the magnitude of the resistance R as:

$$R = 1.99\, R_{g2} \quad (10)$$

and which results in the magnitude of capacitance C as:

$$C = 1/0.7128R. \quad (11)$$

The low frequency asymptote turns ratio ($n$) for the case of a ½ dB Chebyshev response is:

$$n = R_{g2}/(1.51\, R_{g1}). \quad (12)$$

In the actual gyrators employed, the magnitudes of $R_{g1}$ and $R_{g2}$ were found to be 15KΩ and 60KΩ, respectively. The effective turns ratio $n$ is then found from equation (12) to be 2.67 and the magnitude of the resistance R is found from equation (10) to be 119KΩ. The final step consists of frequency scaling from 1 rad/sec to $2\pi(4\times10^3)$ rad/sec by $$C = (0.7128\times119\times10^3)^{-1}(8\pi\times10^3)^{-1} = 470\,pF \quad (13)$$

Figure 2:
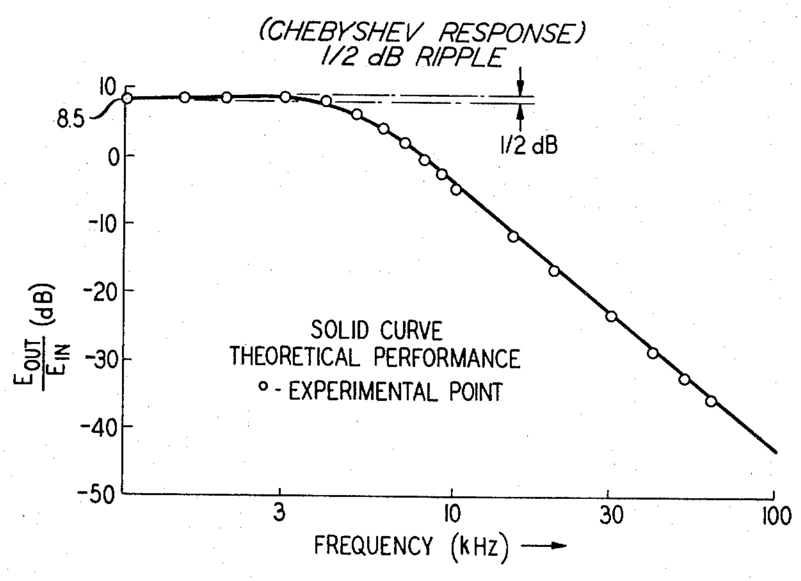
FIG. 2 is a plot of output voltage/input voltage versus frequency for a theoretical Chebyshev response curve compared with an actual response curve of the circuit shown in FIG. 1 with component values tailored, however, to produce a Chebyshev response.

The comparison of experimental and theoretical results from the foregoing circuit design is illustrated by the plots of FIG. 2 in which it may be noted that excellent agreement is obtained throughout the frequency range of measurement.

Figure 3:
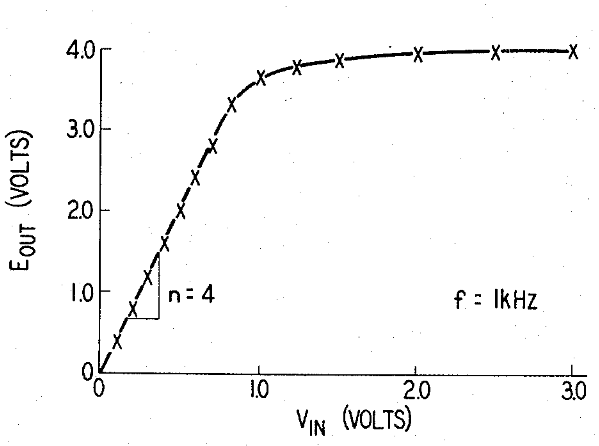
FIG. 3 is a plot of the static input-output relation for a gyrator-simulated transformer in accordance with the invention.

As an additional comparison of interest, the static or D.C. input-output relation for a gyrator-simulated transformer in accordance with the invention is evaluated and illustrated by the curve of FIG. 3 for the case where $n$=4. The linear portion of the curve for $E_{IN}$ <0.8 volts corresponds to conventional operation. Transistor saturation and limiting duplicates the magnetization curve saturation.

The forgoing discussion has indicated how the magnitudes of each of the impedance elements in each of the three coupling networks of FIG. 1 may be determined in accordance with the principles of the invention to arrive at an effective transformer circuit with desired properties in terms of frequency response and effective turns ratio. As shown in FIGS. 4A, 5A, 6A and 7A, a variety of coupling network configurations and combinations may be employed in a transformer in accordance with the invention. In the discussion of these circuits which follows, mathematical computation of component values has for the most part been omitted and, instead, in the interest of brevity, a generalized equivalent circuit and a generalized response characteristic is illustrated in each case.

Figure 4A:
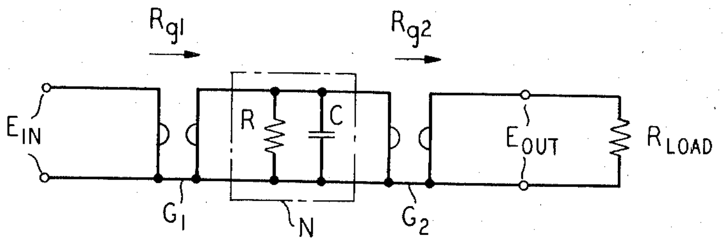
FIG. 4A is a schematic circuit diagram of a transformer in accordance with the invention employing a single intermediate coupling network.
Figure 4B:
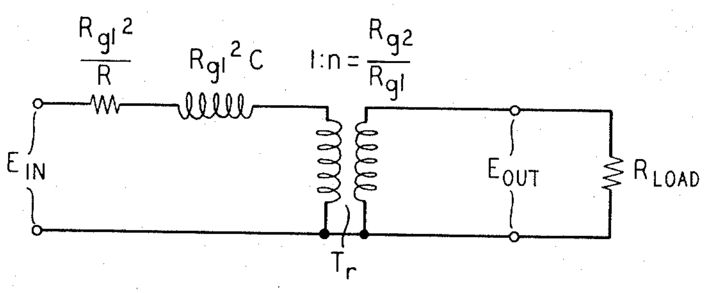
FIG. 4B is a schematic circuit diagram of an equivalent circuit for the circuit of FIG. 4A.
Figure 4C:
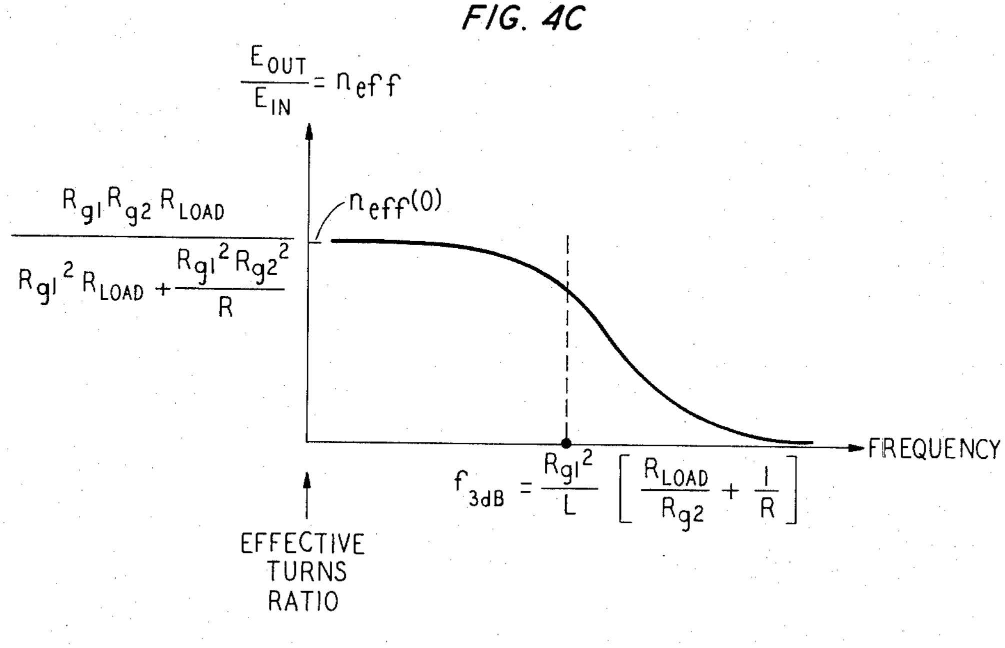
FIG. 4C is a plot of the response characteristics of the circuit of FIG. 4A.

In the example of FIG. 4A, there is a single two-port intermediate coupling network N employing the combination of a shunt resistor R and a shunt capacity C to couple the two gyrators $G_1$ and $G_2$. As shown in FIG. 4B, and equivalent circuit includes both a resistance and an inductance in series with the effective transformer $T_r$. The performance curve of FIG. 4C shows that the ratio $E_{OUT}/E_{IN}$ is the effective turns ratio $n_{eff}$ of the network and that the circuit has a one-pole response. Quantitative expressions for the bandwidth limit $f_{3dB}$ and for the low frequency value of the effective turns ratio $n_{eff}(0)$ are also indicated in FIG. 4C.

Figure 5A:
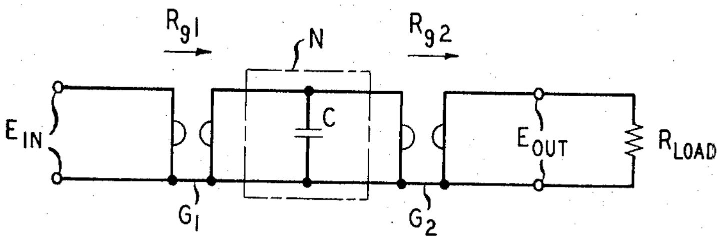
FIG. 5A is a schematic circuit diagram of a transformer in accordance with the invention identical to that shown in FIG. 4A with the exception that the intermediate coupling network comprises only a single capacitor.
Figure 5B:
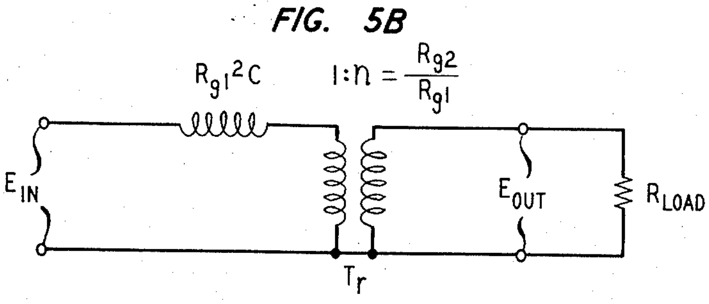
FIG. 5B is a schematic circuit diagram of an equivalent circuit for the circuit of FIG. 5A.
Figure 5C:
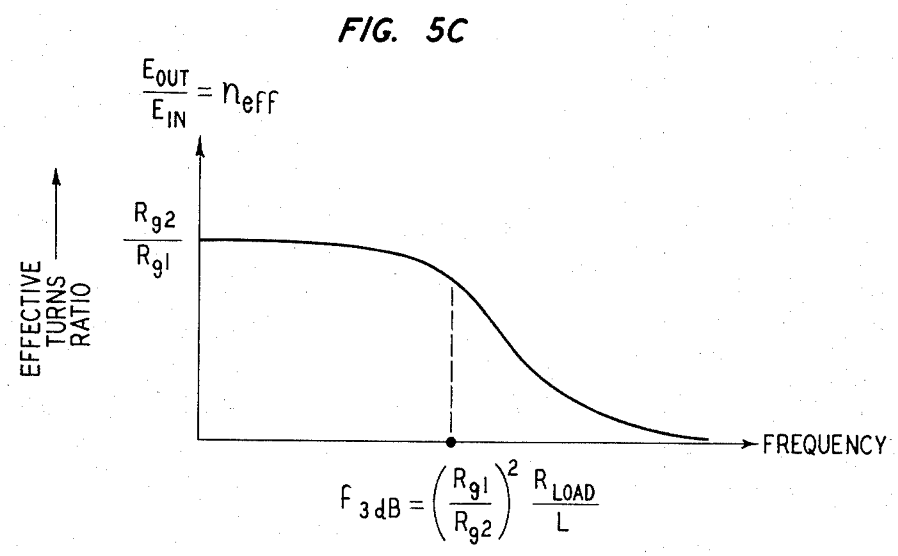
FIG. 5C is a plot of the response characteristics of the circuit of FIG. 5A.

The circuit of FIG. 5A realizes a floating inductor of magnitude $R_{g1}^2C$ in series with the primary of the effective transformer $T_r$, as shown in FIG. 5B, by the use of an intermediate two-port coupling network N which employs a single shunt capacitor C to couple the gyrators $G_1$ and $G_2$. The ABCD matrix for this case may be expressed as:

$$[T]=\begin{bmatrix} \frac{R_{g1}}{R_{g2}} & \frac{R_{g1}R_{g2}}{Z} \\ O & \frac{R_{g2}}{R_{g1}} \end{bmatrix} \quad (14)$$

where $R_{g1} = R_{g2}$ and where $Z = j/\omega C$, Z being the coupling network impedance. As indicated, this case results in a floating inductor with the magnitude indicated in FIG. 5B in cascade with a 1:1 transformer $T_r$. The generalized response curve is shown in FIG. 5C.

Figure 6A:
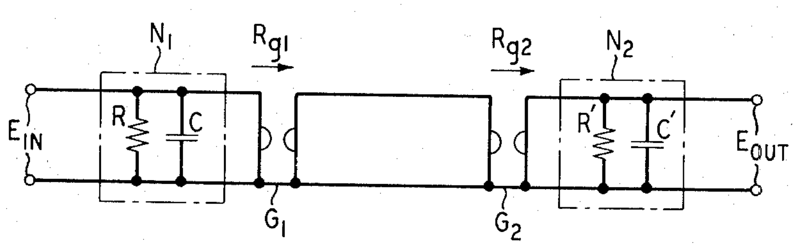
FIG. 6A is a schematic circuit diagram of a transformer in accordance with the invention employing only a primary and a secondary coupling network.
Figure 6B:
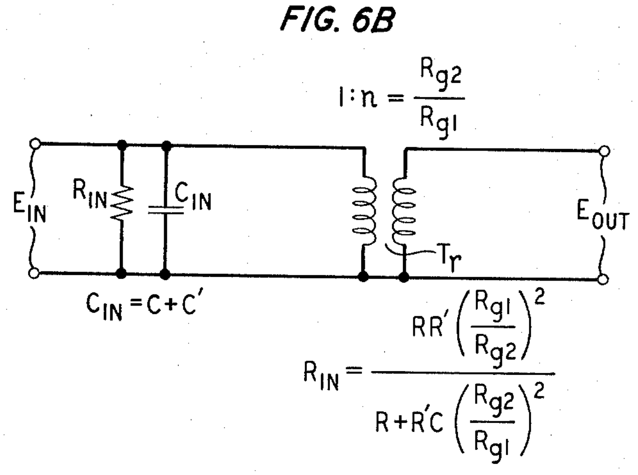
FIG. 6B is a schematic circuit diagram of an equivalent circuit for the circuit of FIG. 6A.
Figure 6C:
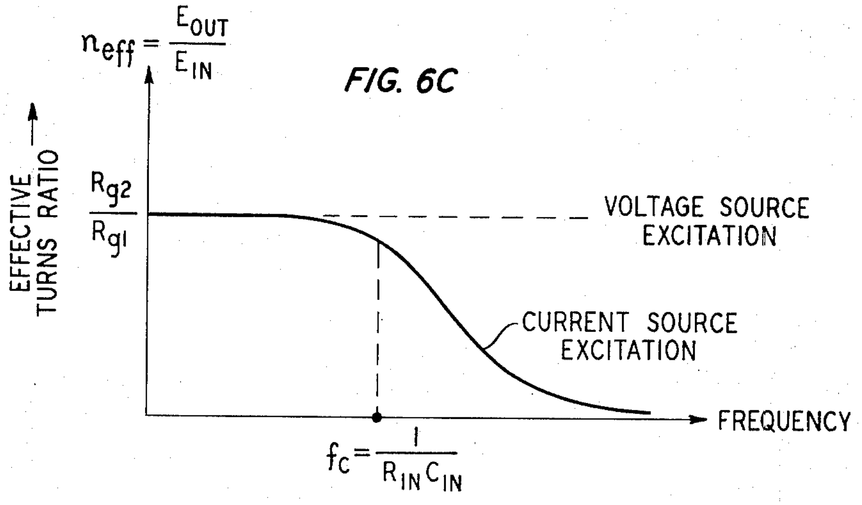
FIG. 6C is a plot of the response characteristics of the circuit of FIG. 6A.

Another form of a coupling or compensating network arrangement in accordance with the invention is illustrated by FIG. 6A, the equivalent circuit for this structure being shown in FIG. 6B and the frequency/effective turns ratio response being shown in FIG. 6C. The latter shows specifically how the natural frequency of the structure depends upon the form of the input excitation. For a current source input, the one-pole response function has a pole at $f_c = 1/2\pi R_{IN} C_{IN}$ and as also indicated in FIG. 6C has a low frequency turns ratio value of $n_{eff}(0) = R_{g2}/R_{g1}$.

Figure 7A:
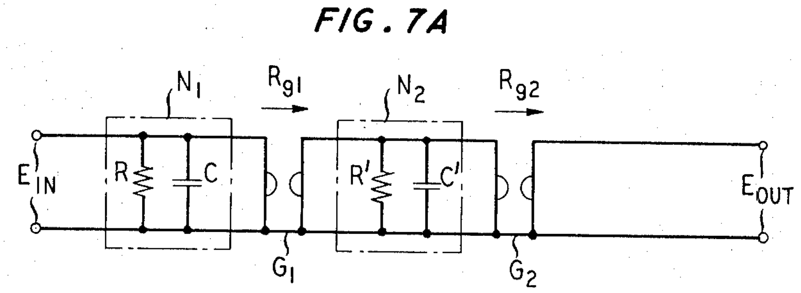
FIG. 7A is a schematic circuit diagram of a transformer in accordance with the invention employing primary and intermediate coupling networks.
Figure 7B:
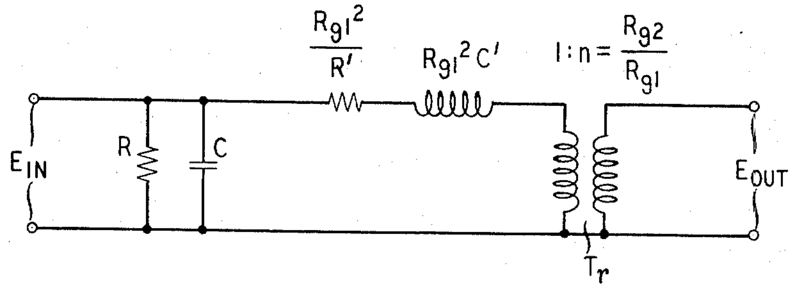
FIG. 7B is a schematic circuit diagram of an equivalent circuit for the circuit of FIG. 7A.
Figure 7C:
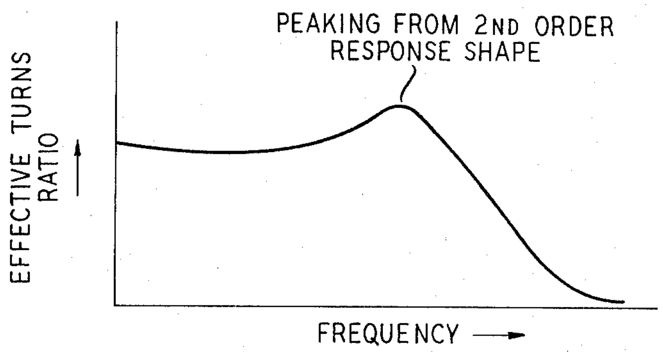
FIG. 7C is a plot of the response characteristics of the circuit of FIG. 7A.

One additional illustrative compensating network combination in accordance with the invention is shown in FIG. 7A where a first two-port coupling network $N_1$ is employed to couple the effective transformer input points to the primary gyrator $G_1$ and where a second two-port coupling network $N_2$ is employed as an intermediate network coupling the two gyrators $G_1$ and $G_2$. The equivalent circuit or circuit model of FIG. 7B shows two independent reactances, namely, the capacitor C and inductor of magnitude $R_{g1}^2C'$ which makes possible a second order transfer function with its characteristic peak as shown in FIG. 7C.

In all of the examples shown, the effective transformer properties in terms of both effective turns ratio and frequency response are controlled in accordance with the principles of the invention by the combined characteristics of the coupling networks and gyrators, thus enabling the circuit designer to select those characteristics he desires for the application at hand.

It is to be understood that the embodiment described herein is merely illustrative of the principles of the invention. Various modifications thereto may be effected by persons skilled in the art without departing from the spirit and scope of the invention.

What is claim is:

1. An effective transformer adaptable for fabrication in integrated circuit form comprising, in combination, a primary circuit including a pair of input points and a primary gyrator circuit, a secondary circuit including a pair of transformer output points and a secondary gyrator circuit, respective shunt networks connected between said input points and said primary gyrator circuit, between said gyrator circuits and between said secondary gyrator circuit and said output points, said networks and said gyrator circuits being connected in cascade circuit configuration, each of said networks comprising at least one circuit element having positive resistance and at least one circuit element having positive capacitance.

2. Apparatus in accordance with claim 1 wherein the forward and reverse gyration resistances of said primary gyrator circuit are equal, wherein the forward and reverse gyration resistances of said secondary gyrator circuit are equal and wherein the gyration resistances of said primary and secondary gyrator circuits are unequal, the effective turns ratio of said transformer being determined by said last named gyration resistances.

* * * * *